H. ROWNTREE.
ELECTRIC CONTROL MECHANISM FOR AIR BRAKES.
APPLICATION FILED JUNE 29, 1908.
1,014,852.
Patented Jan. 16, 1912.
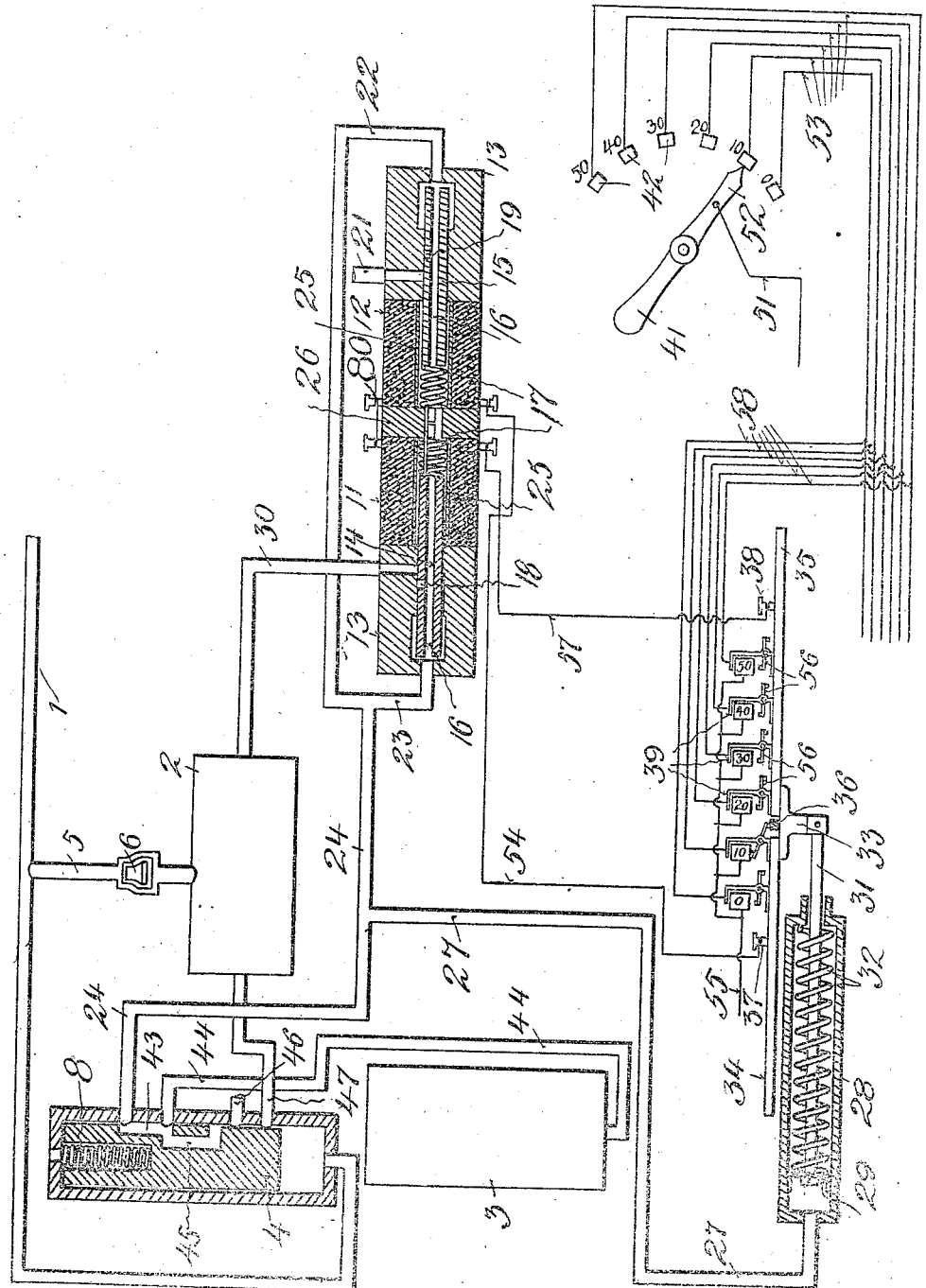

UNITED STATES PATENT OFFICE.

HAROLD ROWNTREE, OF CHICAGO, ILLINOIS, ASSIGNOR TO NATIONAL PNEUMATIC COMPANY, A CORPORATION OF WEST VIRGINIA.

ELECTRIC CONTROL MECHANISM FOR AIR-BRAKES.

1,014,852.      Specification of Letters Patent.      Patented Jan. 16, 1912.

Application filed June 29, 1908. Serial No. 440,846.

*To all whom it may concern:*

Be it known that I, HAROLD ROWNTREE, a citizen of the United States, residing at Chicago, county of Cook, State of Illinois, have made a certain new and useful Invention in Electric Control Mechanism for Air-Brakes, of which the following is a specification.

The invention relates to electric control mechanism for air brakes.

The object of the invention is to provide means in an air brake system for controlling electrically the supply of pressure to the brake cylinder.

A further object is to provide an electric control mechanism for air brake systems wherein the pressure in the brake cylinder is automatically maintained at uniform degree corresponding to the position of a control handle for controlling the electric circuits of the electric devices.

A further object of the invention is to provide means whereby an electrically operated control of the brake cylinder pressure operates in conjunction with an ordinary triple valve in such manner that in case the electric control should fail in its intended operation the triple valve would operate in the usual manner to effect the desired control of the brake cylinder pressure.

A further object is to provide an electric control for air brake systems wherein simultaneous operation of the brake mechanism is effected on all the cars of a train, and wherein the brake pressure on each car bears a definite relation to the position of the control handle regardless of leakage.

Further objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

The single view of the accompanying drawing shows somewhat diagrammatically an electric control mechanism for air brake systems, embodying the principles of my invention.

Referring to the accompanying drawing: 1 designates a train pipe for supplying the pressure to the various cars of the train. Upon each car is arranged the ordinary auxiliary reservoir or tank 2, the brake cylinder 3 and the triple valve 4. The brake mechanism is not illustrated as it will be readily understood that any usual or well known construction and arrangement of brake mechanism may be employed. Pressure is supplied from the train pipe 1, to the auxiliary reservoir or tank 2, in any suitable manner, as for instance, through a pipe or connection 5 in which is arranged a check valve 6, in the ordinary manner. One end of the triple valve casing is connected freely by a pipe 7 to the train pipe. The pressure thus supplied to the triple valve casing is exerted upon the triple valve 4 to normally maintain the triple valve pressed toward the other end of the triple valve casing and such pressure is arranged to be opposed by an opposing pressure, such for instance, and as embodying one form of my invention, as afforded by a spring 8.

Except as hereinafter noted the parts so far described may be of any suitable or well known construction and arrangement.

11 and 12 designate solenoid coils. These coils are mounted upon the casing 13 having a longitudinal bore therethrough, and co-operating with each solenoid coil 11, 12, is a core 14, 15, respectively, said cores operating within the bore of casing 13. Each core 14, 15, is provided with a longitudinal bore or channel 16 therethrough, and springs 17 arranged within the bore of casing 13 engage the inner ends of the cores 14, 15, and normally operate to press said cores outwardly. Other means may be employed for normally maintaining the cores withdrawn more or less or partly from their coils.

The cores 14, 15, are provided with openings or ports 18, 19, respectively adapted to be brought into and out of register with pipes 20 and 21, respectively. That is, the port 19 formed through the wall of core 15, is adapted to be brought into register with connection 21, whenever the solenoid coil 12 is energized so as to draw said core 15 into said coil and against the action of its retracting means, as 17, and when said coil 12 is deënergized, or its circuit broken, the retracting means 17 serves to withdraw core 15 from said coil, thereby carrying port 19 out of register with connection 21. Similarly when coil 11 is energized core 14 thereof is drawn into said coil against the action of its retracting means 17, thereby bringing port 18 into register with connection 30. And when magnet 11 is deenergized, or its circuit broken, its retracting means 17 serves to withdraw core 14 from the magnet coil 11, thereby carrying the port 18 out of register with connection 30. The connections 30 and 21 extend through the casing 13, the connection 30 running from the auxiliary reservoir or tank 2, and the connection 21, delivering to the atmosphere. Pipe connections 22, 23 communicate respectively with opposite ends of casing 13, said connections being joined and extending through connection 24 to the triple valve casing. In practice and in order to protect the windings of magnet coils 11, 12, from any dampness or moisture that might be present in the compressed air, I prefer to arrange said coils on the outside of the casing 13, as shown and hence out of access of the compressed air thereof. To this end said coils are wound upon sleeves 25 connected to or forming part of the casing 13.

If desired and in order to prevent both solenoid cores 14, 15, from being simultaneously drawn into their respective coils I interpose rod 26 between the juxtaposed or proximate ends of said cores, said rod being of sufficient length to permit either one of the cores to be fully drawn into its coil, but preventing both cores being drawn into their coils at the same time. From pipe connection 24 leads pipe 27, to one end of the cylinder 28, in which operates a piston 29, having a rod 31 connected thereto and operating through the other end of said cylinder. The pressure supply to the cylinder 28 through connection 27 is opposed by suitable means as for instance, spring 32, the tension of said means normally operating to move piston 29 toward that end of cylinder 28, into which pressure is delivered through pipe 27. The piston rod 31, carries a cross-head 33, to which are connected contact strips 34, 35. These strips are separated from each other and a neutral or insulated block 36 is placed between the proximate ends thereof. Coöperating with the contact strip 34 is a contact 37, and similarly coöperating with strip 35 is a contact 38. Coöperating with the strips 34 and 35 are the series of magnets 39, corresponding with the various degrees of pressure which it is desired to maintain in the brake cylinder. The circuits of these various magnets, and of the electromagnet coils 11, 12, are controlled by a control handle 41, operating over a series of contacts 42, and which correspond, in like manner to the magnets 39, with the various degrees of pressure to be maintained in the brake cylinder. Thus it will be noted that the various contacts 42 and also the corresponding magnets 39 are marked respectively, "0," "10," "20," "30," "40," and "50," thereby indicating that when the control handle 41 is moved into contact with either one or another of the contacts 42, then the circuit of its corresponding magnet 39 is thereby controlled, and through the operation of the magnet the corresponding degree of pressure, or the pressure corresponding to the position of the control handle, is automatically maintained in the brake cylinder of the car, and in case of a train of cars, the same corresponding pressure is automatically maintained in the brake mechanism on each car throughout the train.

It is to be understood that the arrangement above set forth is the arrangement on each car of the train, except that the control handle 41 and the contacts 42 may, if desired, in case of a train of cars be located on the engine, or other convenient point, to be operated and controlled by the engineer or other proper party.

The triple valve 4 is provided with a passage 43, for controlling the communication of connection 24, through pipe or other connection 44, with the brake cylinder 3. The triple valve is also provided with a passage 45, for controlling communication between the brake cylinder pipe 44, and the exhaustive connection 46, or to the connection 47, with the auxiliary reservoir.

It is to be understood, of course, that the train pipe 1, extends throughout the length of the train of cars, in case of the use of my invention on trains, the sections thereof on each car being connected up to each other at their ends by hose couplings or otherwise, in the usual manner.

Current is supplied to the circuits of the sets or series of magnets 39, and the solenoids 11 and 12, from any convenient source. I have shown a connection 51 which may be considered the main wire connection, and which is connected to the contacting end 52 of control lever 41. Each of the contacts 42 from which the control lever operates, is connected to one of the conductors 53, the various conductors 53 extending throughout the train. On each car of the train branch conductors 58 extend from the conductors 53 to and through the various magnets 39, and thence to the common return wire or ground connection 55. Ordinarily this return connection may be accomplished through some part of the framing of the car. Each magnet 39 is provided with a pivoted armature 56, which, when the magnet is energized, is rocked so as to carry one end or portion thereof into coöperative contacting relation with the contact strip 34 or 35, as the case may be, arranged adjacent thereto, and when such magnet is deënergized the armature falls back, thereby breaking such connection with the contact strips 34, 35. The contact 37, as above explained, is designed to be in constant contacting relation with respect to the contact strip 34, and similarly the contact 38 is in constant contacting relation with respect to the contact strip 35. The circuit of solenoid 11 is completed from contact 38 through conductor 57, and thence to return conductor 80, and similarly the circuit of solenoid 12, is completed from contact 37, through conductor 54 and thence to the common return 80. Each of the conductors 58, at the point where it enters the winding of its magnets 39 is also connected to the armature 56 thereof, so that the moment the magnet is energized, and its armature attracted, current is permitted to pass through such armature 56, to the portion thereof which contacts with its associated strip 34, 35, and thence through the windings of one or the other of the solenoid coils 11, and 12, according to the relation of the particular magnet 39, with reference to one or the other of said strips 34, 35, while at the same time, current is permitted to continue to flow through the coils of the magnet 39.

The operation of the apparatus will be readily understood from the foregoing description, and is as follows: Suppose, by way of illustration, that there is no pressure in the brake cylinder. In this case the piston 29, in cylinder 28, will be held at the limit of its movement toward that end of said cylinder which is open to the brake cylinder pressure. In this position the contact strip 35, will be held in operative relation with all of the associated magnets 39, except that the magnet 39 which is marked "0", in this case will be in contact with the neutral point 36. Now suppose control handle 41 is moved into the position thereof indicated in the drawing to complete circuit connection to the contact 42 which is marked "10". Thereupon circuit is completed from the main conductor 51 through contact member 52 of the control handle, the contact 42 which is marked "10", thereby indicating a brake cylinder pressure of ten pounds, thence circuit is completed through one of the wires 53 throughout the train and through one of the wires 58, in each one of the cars of the train to the corresponding magnet 39 which is marked "10", and also through the armature of said magnet, when the latter is attracted, to the contact strip 35, a portion of the current flowing through said contact strip 35, contact 38, wire 57, electromagnet 11 and return 58, and a portion of the current flowing through the coil of the magnet marked "10", and to return 55. The resulting energization of solenoid 11 effects a movement of its core valve 14 into such coil, thereby bringing port 18 of such core valve into more or less complete register with the pipe or other connection 30 from the tank 2, and hence admitting pressure through the bore 16 of said valve core, connection 23, connection 24, passage 43 of the triple valve and brake cylinder connection 44. At the same time a corresponding pressure is admitted through a connection 27 to cylinder 28, thereby shifting piston 29, and correspondingly shifting the position of contact strip 35 with reference to the magnet 39 marked "10", as above noted. As soon as the desired ten pounds is thus admitted to the brake cylinder and to cylinder 28, the contact strip 35 is shifted to such a point as will cause the armature of the magnet marked "10" to ride off of strip 35, and to contact with neutral point 36, thereby breaking the circuit connection of electromagnet 11, and hence cause a return or withdrawal movement of the core valve 14, under the influence of its retracting means 17 to cut off position. If the pressure admitted to the brake cylinder and to the automatic control cylinder 28 is in excess of the desired ten pounds the piston 29, will be shifted a distance sufficient to bring contact strip 34 into coöperative relation with respect to the armature of the magnet marked "10" to effect a closing of the circuit through said strip 34 and contact 37 of the solenoid 12, thereby actuating the core valve 15 into position to cause port 19 to register with exhaust connection 21, thereby opening the brake cylinder and also the automatic control cylinder 28 to exhaust, and hence reducing the pressure therein, at least to the point where the armature of magnet marked "10" is brought into contact relation with the neutral point 36, which will result in breaking the circuit of solenoid 12, and the return of the core valve thereof to cut off position. Of course it is to be understood that all of the magnets marked "10", in the example above given, on all of the cars remain energized so that the automatic regulation and control of the brake pressure is maintained throughout all of the cars throughout the train. The action is also simultaneous on all of the cars, although the regulating apparatus including the automatic control cylinder, the set of magnets 39 and the electrically operated valves 14 and 15 of each car are independent of the corresponding parts on the other cars.

It is obvious that the arrangement above described is equally well adapted for use on single cars. In this case a control handle 41 will be located at either or both ends of the car. The apparatus above described remains the same with the exception that the circuit wires 53 will not connect up with any other car.

It will be seen from the foregoing description that the automatic control of the air brake pressure is accomplished electrically.

It will also be seen that the brake pressure bears direct relation to the position of the control handle so that the engineer or other attendant manipulating said control lever can determine by reference to the position of said handle the degree of pressure in the brake cylinders. It will also be seen that in case of leakage at any point in the system the desired predetermined pressure is maintained in the brake cylinder, dependent in degree upon the position of the control handle 42, whatever such leakage may be, or wherever it may occur throughout the system, for the reason that through variation in the pressure within cylinder 28, and such pressure will vary with any variation in the brake cylinder pressure which might be caused by leakage at any point in the system, the circuit of one or the other of the solenoids 11, 12, will be completed or broken, thereby properly actuating one or the other of the core valves to supply more pressure to the brake cylinder, or to exhaust pressure therefrom, thereby also supplying more pressure to, or exhausting the same from the automatic regulating cylinder 28, and hence maintaining the desired predetermined pressure in the brake cylinder.

While I have described the operation with reference to the coöperation of lever handle 41, with the contact 42, which is marked "10," it will be readily understood that the same method of operation is involved when the conductor part 52 of control lever 41 coöperates with either one or the other of contacts 42, the difference being merely in the particular magnet 39, the circuit of which is completed. The action remains the same, the control of the circuits of the solenoids 11, 12, being subject to the variations of pressure in the automatic controlling cylinder 28 and that pressure being dependent upon the pressure which it may be desired to maintain in the brake cylinder.

If for any reason the supply of electric current for operating the control of the brake system should be cut off, it is important that the engineer should still retain control of the brakes. It is also important that in case the train should pull apart that the brakes should instantly be applied. To enable these objects to be accomplished, I so arrange the mechanism that the electric control devices are operative only so long as a certain pressure is maintained in the train pipe, and as soon as the train pipe pressure is reduced below this point, the electric control devices immediately become inoperative, if they are not already so, and the further control of the brake pressure and of the brake mechanism, is effected entirely through the triple valve 4, by varying the pressure in the train pipe in the ordinary manner. Suppose for example that the pressure normally carried in the train pipe is ninety pounds, and that this is the desired predetermined pressure at which the electric control devices are operative. This pressure, through the pipe 7, admitted to the end of the casing in which operates the four way valve 4, and which I have called a triple valve, is sufficient to hold the said valve 4 against the opposite end of the casing and in position to maintain the spring 8 under the limit of its compression. In this position the pipe 24 from the casing of the electric control valves is in communication through the port 43, with the pipe 44, to the brake cylinder. The moment, however, the train pipe pressure is reduced, either by the operation of any suitable form of control valve or by the train pulling apart, or otherwise, the valve 4, begins to move under the influence of spring 8, toward the opposite end of the casing. The first effect of this movement of said valve is to cut off the communication of pipe 24, with passage or port 43, thereby cutting off all communication between the electric control valve and the brake cylinder. I propose to so proportion the strength of spring 8, that as soon as the pressure in the train pipe has fallen, to, say, seventy five pounds, the valve 4 will have moved sufficiently far, under the influence of spring 8, to entirely cut off the communication between pipe 24 and passage 43, and at the same time to open communication between pipe 44, passage 43, and passage 45, to the exhaust pipe connection 46, thereby opening the brake cylinder to exhaust. A further reduction of train pipe pressure to, say, sixty pounds, will result in a further movement of valve 4, into position to cut off the communication of passage 45, with the exhaust 46, and to open communication between said passage 45, and the auxiliary tank 2, through pipe 47, thereby opening the auxiliary tank to the brake cylinder, thereby instantly applying the brakes. As long, therefore, as the full train pipe pressure is maintained in the train pipe the electric control devices are operative and the pressure in the brake cylinder will be proportioned to the position of the engineer's control handle thereby maintaining the pressure in the brake cylinder in constant relation to the position of the control handle regardless of any leakage at any point in the system, but as soon as the train pipe pressure is reduced below the predetermined degree, the electric control valve is cut off and rendered inoperative and the brake cylinder is opened to exhaust. Further reduction of train pipe pressure causes auxiliary tank pressure to be admitted to the brake cylinder.

I have not shown any form of controlling valve for the train pipe as such valve forms no part of my present invention, and any desired or well known type or form of engineer's control valve may be used to control the pressure in the train pipe.

Having now set forth the object and nature of my invention, and a construction and arrangement embodying the principles thereof, what I claim as new and useful and of my own invention and desire to secure by Letters Patent is:

1. In an air brake system, a brake mechanism and electrical devices for maintaining any desired predetermined pressure supply to the brake mechanism, circuits for said electrical devices, and means for automatically controlling said circuits.

2. In an air brake system, a brake mechanism, and electrically operated means for controlling the supply and exhaust of pressure medium to and from the brake mechanism, said controlling means operating to automatically maintain any desired predetermined pressure supply to the brake mechanism.

3. In an air brake system, a brake mechanism, electrical devices for controlling the exhaust of pressure from said brake mechanism, and means for automatically controlling the circuit of said electrical devices to maintain uniform pressure in the brake mechanism varying in amount according to the relative position of the control lever.

4. In an air brake system, a brake mechanism, electrically operated devices for controlling the supply and exhaust of operating medium to and from the brake mechanism, and means operating to automatically control the circuits of said devices to maintain predetermined pressures in the brake mechanism.

5. In an air brake system, a brake mechanism, valves for controlling the supply and exhaust of pressure medium to and from the brake mechanism, electrical devices for operating said valves, and means automatically controlled according to different predetermined pressures for controlling the circuits of said electrical devices.

6. In an air brake system, a brake mechanism, and valve for controlling the supply of operating medium to said mechanism, an independent valve for controlling the exhaust of operating medium from said mechanism, and electrical devices for controlling said valves whereby the degree of pressure in the brake mechanism corresponds to the relative positions of the electrical devices.

7. In an air brake system, a brake mechanism, means for controlling the supply and exhaust of operating medium to and from said mechanism, electrical devices for operating said controlling means, circuits for said electrical devices and means operated by variations in brake pressure for controlling said circuits whereby the degree of pressure in the brake mechanism is maintained at uniform degrees according to the relative position of the electrical devices.

8. In an air brake system, a brake mechanism, means for controlling the supply and exhaust of pressure medium to and from said mechanism, electrical devices for operating the same, and automatically operated devices for controlling the circuits of said electrical devices whereby the degree of pressure is maintained uniform in the brake mechanism according to the relative position of the electrical devices.

9. In an air brake system, a brake mechanism, means for controlling the supply and exhaust of pressure medium to and from said pressure mechanism, electrical devices for operating the same, circuits therefor, and means operated by the pressure medium for automatically controlling the circuits of said electrical devices whereby the degree of pressure is maintained uniform in the brake mechanism according to the relative position of the electrical devices.

10. In an air brake system, a brake mechanism, valves for controlling the supply and exhaust of operating medium to and from said mechanism, solenoids for controlling said valves, a control lever arranged to be set to different positions corresponding to any desired predetermined pressure, and means controlled conjointly by said lever and by variations in the brake pressure for controlling the circuits of the solenoids.

11. In an air brake system, a brake mechanism, a supply valve and an exhaust valve therefor, solenoids to control said valves, a control lever arranged to be set to different positions corresponding to any desired pressure, and automatic devices coöperating with the control lever for controlling the circuits of the solenoids.

12. In an air brake system, a brake mechanism, supply and exhaust controlling valves therefor, a control lever arranged to be set to different positions to predetermine the degree of pressure supply, electrical devices for controlling the valves to maintain the pressure uniform at whatever degree it may be predetermined by the position of the control lever circuits for the electrical devices, and means for automatically controlling said circuits.

13. In an air brake system, a brake mechanism, controlling valves therefor, electrical devices for operating the valves, circuits therefor, a control lever arranged to be set to different positions to predetermine the degree of brake pressure, and means operated by variations in the pressure as predetermined by the position of the lever for controlling said circuits to maintain the pressure uniform at the predetermined degree.

14. In an air brake system, a brake mechanism, electrical devices for controlling the supply and exhaust of pressure medium to and from said mechanism, a control lever arranged to be set to different positions to predetermine the degree of pressure and means coöperating with the lever when in pressure predetermining position for controlling the circuits of said pressure controlling devices whereby uniform predetermined pressure is maintained in the brake mechanism.

15. In an air brake system, a brake mechanism, supply and exhaust controlling means therefor, electrical devices for operating the same, circuits for said devices, magnets for controlling said circuits and a control lever and pressure operated devices coöperating therewith for controlling the circuits of said magnets whereby the degree of pressure in the brake mechanism is uniformly maintained according to the relative position of the control lever.

16. In an air brake system, a brake mechanism, supply and exhaust controlling means therefor, electrical devices for operating the same, circuits for said devices, magnets for controlling said circuits, a control lever for the magnet circuits and automatically movable contacts controlled by variations in the brake pressures and coöperating with said magnets to control the circuits of said devices whereby the degree of pressure in the brake mechanism is uniformly maintained according to the relative position of the control lever.

17. In an air brake system, a brake mechanism, supply and exhaust controlling means therefor, electrical devices for operating the same, circuits for said devices, a control handle arranged to be set to different positions to predetermine the degree of pressure supply to the brake mechanism, and means dependent upon the position of the control lever for controlling the circuits of said electrical devices.

18. In an air brake system, a brake mechanism, pressure medium, supply and exhaust controlling mechanisms, electrical devices for operating the same, a control lever, and means controlled according to the position of said control lever for automatically controlling the circuits of said electrical devices whereby the pressure supplied to the brake mechanism varies according to the position occupied by the lever.

19. In an air brake system, a control lever, a series of contacts with which said lever coöperates, a corresponding series of magnets in respective electric communication with said contacts, automatically movable contact strips, means actuated by said magnets when energized for completing circuits through one or the other of said strips according to the relation of the parts, a brake mechanism, and electrical devices arranged in said circuits for controlling the supply and exhaust of operating medium to and from said brake mechanism.

20. In an air brake system, a brake mechanism, electrical devices for maintaining uniform pressure in the brake mechanism, circuits for said electrical devices, means for automatically controlling said circuits, and means independent of the electrical devices for controlling the brake pressure.

21. In an air brake system, a brake mechanism, electrical devices for controlling the brake pressure, circuits for said electrical devices, means for automatically controlling said circuits, and means independent of the electrical devices for controlling the brake pressure.

22. In an air brake system, a brake mechanism, electrical devices for controlling the brake pressure, circuits for said electrical devices, means for automatically controlling said circuits, and auxiliary means for controlling the brake pressure, said auxiliary means becoming effective when the electrical devices are rendered inoperative.

23. In an air brake system, a brake mechanism, electrical devices for controlling the supply of pressure to said brake mechanism, a control lever arranged to be set to different positions to predetermine the degree of brake pressure, and means controlled conjointly by the position of said lever and variations in the train pipe pressure for controlling the said electrical devices.

24. In an air brake system, a brake mechanism, electrical devices for controlling the brake pressure, circuits therefor, means for automatically controlling said circuits, means for controlling the brake pressure through variations in train pipe pressure, said means becoming effective when the electrical control is rendered inoperative.

25. In an air brake mechanism, a brake mechanism, a control lever, electrical devices for maintaining pressure in the brake mechanism corresponding to the position of the control lever, circuits for said electrical devices, means for automatically controlling said circuits by variations in the pressure and means for controlling the brake pressure when the electrical devices are rendered inoperative.

26. In an air brake system, a brake mechanism, electrical devices for controlling the brake pressure, circuits for said electrical devices, means operative at a predetermined train pipe pressure for controlling said circuits, and means whereby when the train pipe pressure is reduced below such predetermined degree the brake pressure is controlled independently of said electrical devices.

27. In an air brake system, a brake mechanism, for each car of a train, a control lever, arranged to be set to different positions to predetermine the degree of brake pressure and automatic devices for maintaining uniform degrees of pressure in the brake mechanisms of all the cars simultaneously according to the relative positions of the control lever.

28. In an air brake system, a brake mechanism for each car of a train, a control lever, arranged to be set to different positions to predetermine the degree of brake pressure and automatic devices coöperating therewith for maintaining uniform degrees of pressure in the brake mechanism of all the cars simultaneously corresponding to the relative positions of the control lever.

29. In an air brake system, a brake mechanism for each car of a train, electrical devices for simultaneously controlling the brake pressure on all the cars of the train, controlling circuits for said electrical devices, a control lever, and means operated by the pressure medium, coöperating with said lever for controlling the circuits of said electrical devices, whereby uniform degrees of pressure are maintained in the brake mechanism according to the relative positions occupied by said lever.

In testimony whereof I have hereunto set my hand in the presence of the subscribing witnesses, on this tenth day of June A. D., 1908.

HAROLD ROWNTREE.

Witnesses:
L. M. SHIELDS,
J. G. MITCHELL.